United States Patent
Albert et al.

(10) Patent No.: US 8,436,280 B2
(45) Date of Patent: May 7, 2013

(54) DRINK DISPENSER WITH HEATING DEVICE

(75) Inventors: Heinz Albert, Laichingen (DE); Sebastian Casado Gomez, Stuttgart (DE); Jochen Gussmann, Schwäbisch-Gmünd (DE); Michael Heim, Amstetten (DE); Alexander Kiefer, Kuchen (DE); Manfred Ostowski, Geislingen/Steige (DE); Armin Startz, Weidenstetten (DE)

(73) Assignee: WMF Wurttembergische (DE)

( * ) Notice: Subject to any disclaimer, the term of this patent is extended or adjusted under 35 U.S.C. 154(b) by 673 days.

(21) Appl. No.: 12/580,489

(22) Filed: Oct. 16, 2009

(65) Prior Publication Data

US 2010/0096381 A1    Apr. 22, 2010

(30) Foreign Application Priority Data

Oct. 17, 2008    (DE) .................. 10 2008 052 190

(51) Int. Cl.
*F27D 11/00* (2006.01)
*A23F 3/00* (2006.01)
*B67D 7/80* (2010.01)

(52) U.S. Cl.
USPC .............. 219/438; 99/323.3; 222/146.5

(58) Field of Classification Search ............. None
See application file for complete search history.

(56) References Cited

U.S. PATENT DOCUMENTS

| 3,290,484 | A | | 12/1966 | Day | |
|---|---|---|---|---|---|
| 5,283,854 | A | * | 2/1994 | Schiebelhuth | 392/467 |
| 6,123,010 | A | | 9/2000 | Blackstone | |
| 2004/0149139 | A1 | * | 8/2004 | Kollep | 99/279 |
| 2006/0207986 | A1 | * | 9/2006 | Brown | 219/386 |
| 2008/0092747 | A1 | * | 4/2008 | Yoakim et al. | 99/295 |

FOREIGN PATENT DOCUMENTS

| DE | 19609428 | | 9/1997 |
|---|---|---|---|
| DE | 19734557 | A1 | 2/1999 |
| EP | 1865815 | | 5/2008 |
| WO | WO-03/084376 | | 10/2003 |
| WO | WO-2005/053489 | A1 | 6/2005 |
| WO | WO-2006/096266 | | 9/2006 |
| WO | WO-2006/102980 | A1 | 10/2006 |

OTHER PUBLICATIONS

English abstract provided for DE-19734557.
European Search Report dated Feb. 11, 2010 (2 pages).
English abstract for DE-19609428.

* cited by examiner

*Primary Examiner* — Scott B Geyer
(74) *Attorney, Agent, or Firm* — Rader, Fishman & Grauer PLLC

(57) ABSTRACT

The present invention relates to a drinks dispenser with a heating device for the heating of a liquid and with at least one electric accumulator for the energy supply of the drinks dispenser, more preferably of its heating device, which compared with the charge power has a higher discharge power which is greater than 500 watt.

15 Claims, 1 Drawing Sheet

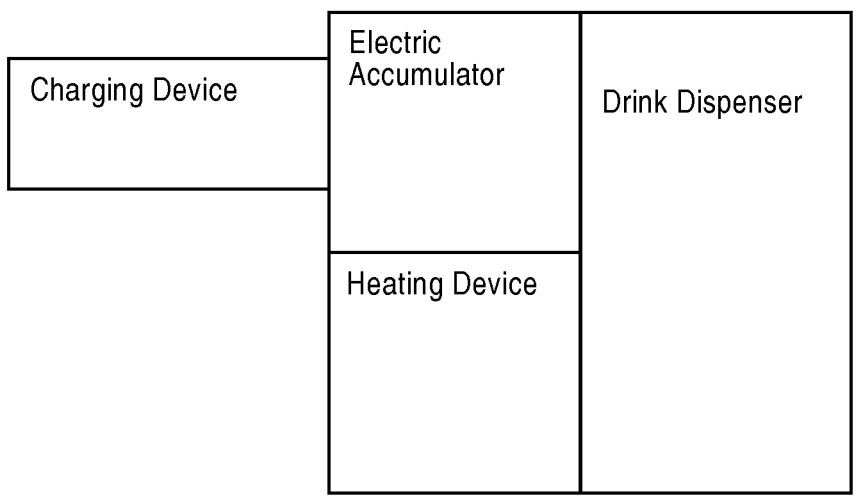

DRINK DISPENSER WITH HEATING DEVICE

CROSS-REFERENCES TO RELATED APPLICATION

This application claims priority to German patent application DE 10 2008 052 190.6 filed on Oct. 17, 2008, which is hereby incorporated by reference in its entirety.

The present invention relates to a drinks dispenser with a heating device for the heating of a liquid required for the preparation of the drink.

Drink dispensers such as for example coffee makers are usually connected to an electric network by means of a power supply unit, for example a 230 V volt network for the supply with electric energy. By connecting the drinks dispenser with such a voltage network adequate electric power for operating the heating device is available. However, if a drinks dispenser for example a coffee maker is to be operated independently of a power network, batteries or electric accumulators have to be provided for this purpose which assume the supply of the drinks dispenser with electric energy. Upon operation of the drinks dispenser by way of the electric accumulator the heating power of the drinks dispenser however is greatly restricted because of the power of such accumulators which results in correspondingly long heating up or brewing times.

The present invention deals with the problem of stating a drinks dispenser with which operation that is independent of an electric power network yet comfortable is possible.

According to the invention this problem is solved through the subject of the independent claim. Advantageous embodiments are the subject of the dependent claims.

The figure illustrates an exemplary drink dispenser with a heating device.

The invention is based on the general idea, illustrated in the figure, of equipping a drinks dispenser with a heating device for the heating of a liquid required for the preparation of the drink with at least one electric accumulator whose discharge power is clearly higher than its charging power. Specifically this means that the at least one electric accumulator can be carefully charged with lower power over a longer period but during the operation of the drinks dispenser, more preferably during the operation of the heating device of the drinks dispenser, provides such a high discharge power that the heating device can preferentially be operated with the same power as is the case when the drinks dispenser is connected to a conventional 230 V voltage network. The charging power here is preferentially 50 watt while the discharge power is more than 500 watt, preferentially 1,000-2,000 watt. The electric energy stored in the at least one electric accumulator can thus be drawn at appropriate level over a short period of time, i.e. more preferably during the heating and/or brewing phase from the electric accumulator so that the heating operation or brewing operation in accumulator mode preferentially does not take longer than in alternative mains mode. Through the charging power which is clearly lower compared with the discharge power the at least one electric accumulator can additionally be charged particularly carefully as a result of which a long life expectancy of the accumulator can be achieved. More preferably, the drinks dispenser in accumulator mode can be operated without losing comfort with regard to drink preparation speed as a result.

With an advantageous further development of the solution according to the invention the at least one electric accumulator is integrated in the drinks dispenser. Obviously it is also conceivable that such an electric accumulator is offered or sold as a separate accessory part. Integration of the at least one electric accumulator in the drinks dispenser however offers the advantage that it can be charged in parallel during mains operation of the drinks dispenser wherein the power supply unit of the drinks dispenser can simultaneously serve as charging device for the electric accumulator. Obviously it is also conceivable here that the charging device is designed in such a manner that damaging overcharging of the accumulator is avoided even with prolonged mains operation of the drinks dispenser so that the charging current is automatically interrupted upon reaching of a certain charging power. The integration of the at least one electric accumulator additionally provides design advantages and additionally creates a drinks dispenser which can optionally be operated either in mains mode or in accumulator mode. Generally the charging device can be designed in such a manner that it can be alternatively connected to a 230 V voltage network to a 110 V voltage network or to a 12 V voltage network for example to a car battery or a generator. The changeover between the various voltages can take place either automatically or through the charging device itself so that it automatically adapts itself to the respective voltage available or by means of a suitable switch as are for example known from conventional razors.

With an advantageous design of the solution according to the invention the charging device is designed as windmill or solar cell. It is also conceivable that the drinks dispenser according to the invention is exclusively operated with the at least one electric accumulator so that no additional and alternatively selectable connection to an electric network is available. For charging the electric accumulator a charging device designed for example in the type of a windmill or a solar cell can be connected with the electric accumulator so that the drinks dispenser can be operated without problems more preferably in the open, for example during a camping holiday where no direct power supply is frequently available.

With a further advantageous embodiment of the solution according to the invention the heating device is designed as a continuous-flow heater, more preferably as bare wire heater. For the rapid heating-up of liquids, for example of water, appropriately high electric power is required. Usually continuous-flow heaters of this type have a so called differential pressure switch which detects a pressure drop in a water pipe behind the continuous-flow heater, supplying it with electric energy as soon as a liquid flow through the electric continuous-flow heater is detected. In contrast with so called boilers or thermal storage water heaters, the continuous-flow heater requires electric energy only at the instant of heating, however relatively much of that for a short period. Once a heating or brewing operation in the drinks dispenser has ended, the energy supply to the heating device is abruptly interrupted. Continuous-flow heaters of this type make it possible to rapidly heat liquids such as more preferably water to the desired temperature but for which they require an extremely high energy supply for a short period. For this reason the drinks dispenser according to the invention comprises an electric accumulator which can make available at least for a short time its very high discharge power for example for operating a continuous-flow heater of this type. Here the electric accumulator makes it possible to provide the high discharge power required for such a short-term operation and do so preferentially multiple times in succession. Nevertheless, the electric energy stored in the electric accumulator can be stored in the long term and renewed again if required via suitable charging devices. In principle, as a result, extremely comfortable operation of the drinks dispenser, which for example can be designed as a coffee maker, can be made possible with the electric accumulator according to the invention, more preferably in an independent state, i.e. disconnected from a conventional power network. Through the charging power which is clearly lower compared with the discharge power careful charging of the accumulator is additionally possible as a result of which it has a long life expectancy.

Obviously the accumulator can be integrated in the drinks dispenser or arranged spatially separate from said drinks dispenser.

The invention claimed is:

1. A drink dispenser comprising:
   a heating device, configured to heat a liquid; at least one electric accumulator energy supply, configured to have a discharge power greater than approximately 500 watts; and a charging device configured to charge the accumulator; wherein the charging device is configured to charge the accumulator with a charging power of approximately no more than 50 watts.

2. The drink dispenser according claim 1, wherein the at least one accumulator is removably integrated in the drink dispenser.

3. The drink dispenser according to claim 2, wherein the drink dispenser is at least one of a coffee maker, a tea water dispenser and a water boiler.

4. The drink dispenser according to claim 1, wherein the charging device is at least one of a high-voltage, 230 V voltage power supply unit and a low-voltage, 12 V voltage power supply unit.

5. The drink dispenser according to claim 4, wherein the drink dispenser is at least one of a coffee maker, a tea water dispenser and a water boiler.

6. The drink dispenser according to claim 1, wherein the charging device is at least one of a windmill, water wheel, Peltier element and a solar cell.

7. The drink dispenser according to claim 1, wherein the drink dispenser is at least one of a coffee maker, a tea water dispenser and a water boiler.

8. The drink dispenser according to claim 1, wherein the heating device is a continuous-flow heater.

9. The drink dispenser according to claim 8, wherein the continuous-flow heater is a bare wire heater.

10. A drink dispenser comprising:
    a continuous-flow bare wire heating device, configured to heat a liquid; and at least one electric accumulator energy supply, configured to have a discharge power greater than approximately 500 watts.

11. The drink dispenser according to claim 10, further comprising: a charging device configured to charge the accumulator.

12. The drink dispenser according to claim 10, wherein the charging device is configured to charge the accumulator with a charging power of approximately no more than 50 watts.

13. A drink dispenser comprising:
    a heating device, configured to heat a liquid;
    at least one electric accumulator energy supply, configured to have a discharge power greater than approximately 500 watts; and
    a charging device configured to charge the accumulator;
    wherein the charging device is at least one of a windmill, water wheel, Peltier element and a solar cell.

14. The drink dispenser according to claim 13, wherein the drink dispenser is at least one of a coffee maker, a tea water dispenser and a water boiler.

15. A drink dispenser comprising:
    a heating device, configured to heat a liquid; and
    at least one electric accumulator energy supply, configured to have a discharge power greater than approximately 500 watts;
    wherein the heating device is a continuous-flow heater; and
    wherein the continuous-flow heater is a bare wire heater.

* * * * *